United States Patent [19]

Jinnai

[11] 4,184,191
[45] Jan. 15, 1980

[54] ENCLOSED SWITCHBOARDS WITH INSULATION TEST CONTACT MEMBER

[75] Inventor: Isao Jinnai, Tama, Japan

[73] Assignee: Tokyo Shibaura Denki Kabushiki Kaisha, Kanagawa, Japan

[21] Appl. No.: 953,033

[22] Filed: Oct. 20, 1978

[30] Foreign Application Priority Data

Oct. 27, 1977 [JP] Japan .................................. 52/128104

[51] Int. Cl.² .............................................. H02B 1/04
[52] U.S. Cl. ..................................... 361/336; 324/54;
                                                           200/50 AA
[58] Field of Search .................. 200/50 AA; 340/647;
              318/490; 324/54; 361/335, 336, 337, 343

[56] References Cited

U.S. PATENT DOCUMENTS 3,578,925  5/1971  Drown ........................... 200/50 AA
3,663,773  5/1972  Powell ........................... 200/50 AA Primary Examiner—Gerald P. Tolin
Attorney, Agent, or Firm—Stevens, Davis, Miller & Mosher

[57] ABSTRACT

An enclosed switchboard includes a stationary contact connected to a load, and a drawout type circuit breaker including a movable contact and movable between a connected position in which the movable contact is in engagement with the stationary contact and a disconnected position in which the movable contact is out of engagement with the stationary contact. The enclosed switchboard is provided with a test contact member which is arranged to engage with the stationary contact when the circuit breaker is drawn out. A plug socket connected to the test contact member is mounted on the switchboard at readily accessible position thereof for connecting an insulation tester.

10 Claims, 6 Drawing Figures

ENCLOSED SWITCHBOARDS WITH INSULATION TEST CONTACT MEMBER

BACKGROUND OF THE INVENTION

The present invention relates to enclosed switchboards and more particularly to devices for facilitating measurement of insulation resistance of a load associated with the enclosed switchboards and a main circuit connected to the load.

In conventional enclosed switchboards, measurement of insulation resistance of a load associated with the main switchboard and a main circuit connected to the load is difficult and dangerous.

As shown in FIG. 1 of the accompanying drawings, a conventional enclosed switchboard 10 comprises a housing 11. In the rear portion of the space inside of the housing 11, there are provided bus bars 12 electrically connected to a source of power supply, not shown, and cables 13 electrically connected to a load shown as a motor 17. A first stationary contact assembly 15 includes stationary contacts (not shown) which are electrically connected to associated ones of the bus bars 12 respectively. A second stationary contact assembly 16 includes stationary contacts 21 which are electrically connected to the associated ones of the cables 13 through conductors 18. A circuit breaker 14 of the drawout type is movable between a disconnected position in which, as illustrated, the movable contact assemblies 14a and 14b mounted on the circuit breaker are out of engagement with the stationary contact assemblies 15 and 16, and a connected position in which the movable contact assemblies 14a and 14b are in engagement with the stationary contact assemblies 15 and 16.

To measure insulation resistance, branch conductors 19 with no insulation thereon are provided in electrical connection with the conductors 18, and one terminal of an insulation resistance tester 22 is contacted with one of the branch conductors 19, with the aid of an insulating hook rod 20 which is inserted through an opening 11a provided in the rear wall of the housing 11. However, while the operator is testing at the back of the switchboard 10, the circuit breaker 14 may be erroneously brought into the connected position to render the branch conductor 19 alive, which is hazardous to the operator and which may damage the tester 22. Also, it is inconvenient that the operator has to be at the back of the switchboard 10 to carry out the measurement.

In another method of measuring the insulation resistance, one terminal of the insulation resistance tester 22 is contacted with the contact 21 of the stationary contact assembly 16. With this method, the operator can be in front of the switchboard, but, the circuit breaker 14 has to be moved out so far as not to be obstructive to the measurement. Also, it is possible that the terminal of the tester 22 is erroneously contacted with the live contact of the stationary contact assembly 15 instead of the contact 21 of the contact assembly 16.

Moreover, in certain types of enclosed switchboards (such as G-type according to the Standards of the Japan Electrical Manufacturers' Association 1153) the conductors of the main circuit must be provided with full insulation thereon. In such cases, the measurement of insulation resistance is accompanied with further difficulty.

SUMMARY OF THE INVENTION

An object of the invention is to facilitate measurement of insulation resistance of a load associated with an enclosed switchboard and a main circuit connected to the load and to enhance safety in such measurement.

According to the invention, there is provided an enclosed switchboard having a stationary contact connected to a load, and a movable electrical equipment of the drawout type including a movable contact, the movable electrical equipment being movable between a connected position in which the movable contact is in engagement with the stationary contact and a disconnected position in which the movable contact is out of engagement with the stationary contact, characterized by comprising a test contact member movable between an engaged position in which the test contact member is engaged with the stationary contact and an unengaged position in which the test contact member is out of engagement with the stationary contact and an actuating member for actuating the test contact member such that the test contact member is in the engaged position when the electrical equipment is in the disconnected position, and in the unengaged position when the electrical equipment is in the connected position.

BRIEF DESCRIPTION OF THE DRAWINGS

In the accompanying drawings.

DESCRIPTION OF THE PREFERRED EMBODIMENT

Figure 1:
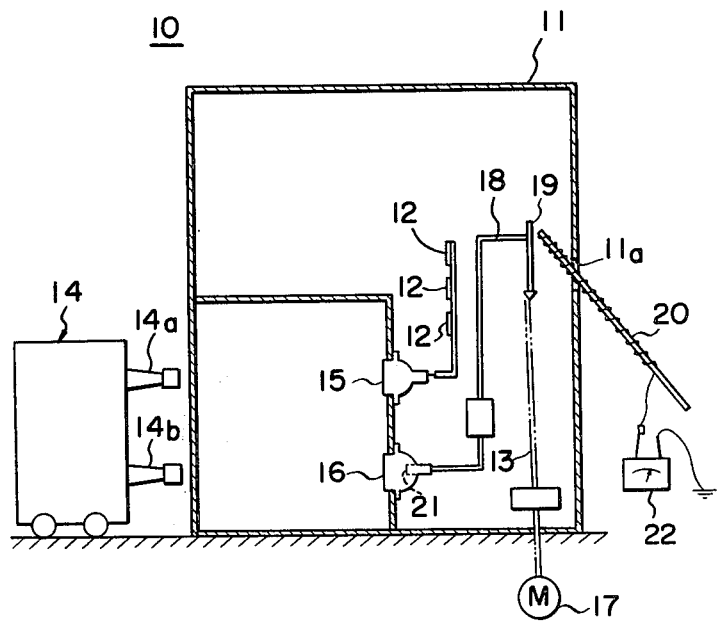
FIG. 1 schematically shows a vertical cross-section of a conventional enclosed switchboard with an insulation resistance tester.

Referring new more particularly to FIGS. 2 through 6, there is shown a preferred embodiment of an enclosed switchboard 30 according to the invention. The switchboard 30 comprises a housing 31. The space inside of the housing 31 is divided by a partition member including a vertical wall 31a and a horizontal sheet 31b into a main compartment 31c which occupies the rear portion and the upper front portion of the space inside of the housing 31 and an auxiary compartment 31d which occupies the lower front portion of the space inside of the housing 31. Provided in the main compartment 31c are bus bars 32 electrically connected to a source of power supply (not shown), and cables 33 electrically connected to a load shown as a motor 17. A first stationary contact assembly 35 is mounted on the vertical wall 31a and includes stationary contacts (not depicted) electrically connected to the associated ones of the bus bars 32. A second stationary contact assembly 37 is also mounted on the vertical wall 31a and includes stationary contacts in the form of studs 42 (FIG. 3) electrically connected to the associated ones of the cables 33.

Denoted by numeral 34 is an electrical equipment such as a circuit breaker of the drawout type provided, at the rear part thereof, with first and second movable contact assembles 36 and 38, which are respectively enageable with the stationary contact assemblies 35 and 37. Provided on the front panel 31e of the housing 31 is a plug socket 39 including a test terminal 39b and a grounded terminal 39c.

Figure 3:
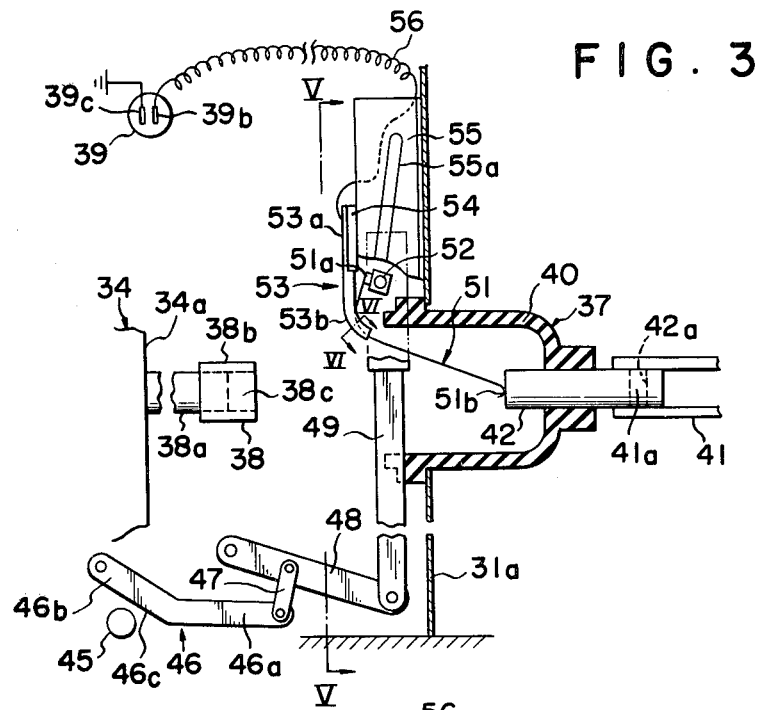
FIG. 3 schematically shows, in vertical section, the detail of a test contact member in engagement with a contact of a stationary contact assembly.
Figure 4:
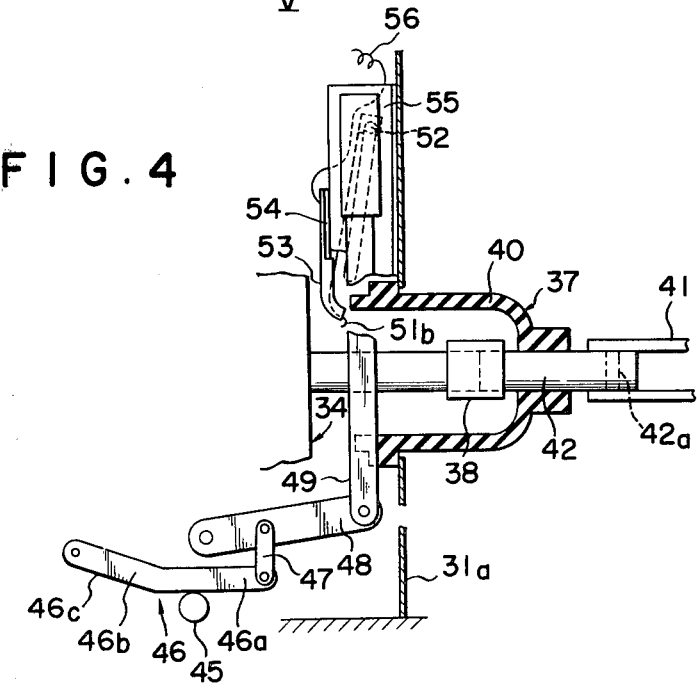
FIG. 4 is a similar view as FIG. 3, except that the test contact member is out of contact with the contact of the stationary contact assembly.
Figure 5:
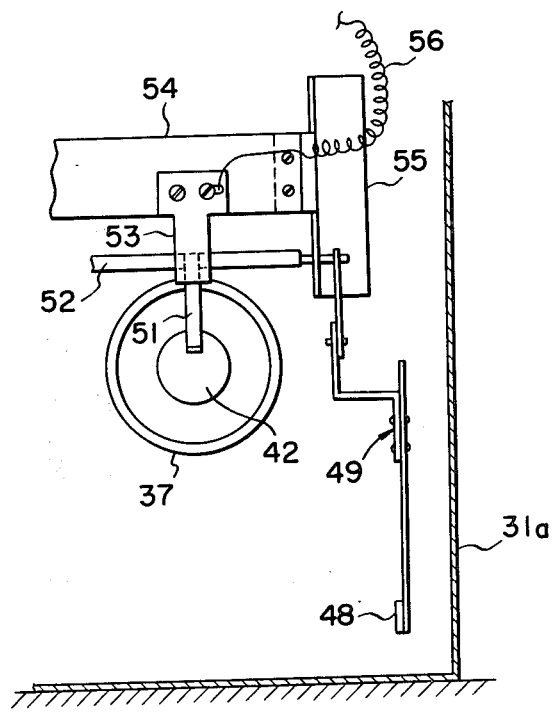
FIG. 5 schematically shows a section on line V—V in FIG. 3.
Figure 6:
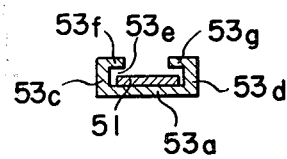
FIG. 6 shows a section of a guide member on line VI—VI in FIG. 4.

As is illustrated in FIGS. 3 and 4, a test contact member 51 substantially of elongated strip in shape and made of resilient material is, at a first or upper end 51a thereof, fixed to an insulator bar 52, by means of screws or the like (not shown). There is also provided a first guide member 53, which, in the illustrated embodiment, comprises as shown in FIGS. 3, 4 and 6, a strip 53a with a curved portion 53b, a pair of side walls 53c and 53d having first ends respectively connected to the edges of the strip 53a to form a channel 53e, and a pair of inwardly extending tabs 53f and 53g having first ends connected to second ends of the side walls 53c and 53d. The strip 53a, the side walls 53c and 53d, and the tabs 53f and 53g may be integrally formed of an electrically conductive material. The test contact member 51 extends, from the upper end 51a, towards the curved portion 53b, and is resiliently bent and slidably received at the curved portion 51b, and the test contact member 51 extends, from the bent portion, towards the stud 42 of the second stationary contact assembly 37. The test contact member 51 is in contact with the guide member 53 at the curved portion 53b to establish electrical connection between the two members 51 and 53. The guide member 53 is electrically connected through a wire 56 to the test terminal 39b.

The guide member 53 is fixed, by screws or the like, to an insulator sheet 54, which is substantially parallel with the vertical wall 31a. The insulator sheet 54 is, at both sides thereof, fixed to a pair of second guide members 55, only one of which being illustrated. The second guide members 55 are secured to the vertical wall 31a.

Each of the guide member 55 is provided with a guide slot 55a which extends substantially vertically, but is a little inclined rearwards. The insulator bar 52 extends through the slot 55a in slidable engagement with the slot 55a, and is journalled by the upper end of a link 49, which moves substantially vertically. The lower end of the link 49 is pivotally connected to the righthand end of a substantially horizontal lever 48. The opposite end of the lever 48 is pivotally connected to a stationary structure (not shown) fixed relative to the housing 31. Pivotally connected to an intermediate point of the lever 48 is the upper end of a substantially vertical connecting lever 47. The lower end of the connecting lever 47 is pivotally connected to the righthand end of a substantially horizontal arm 46. The arm 46 comprises a first arm portion 46a and a second arm portion 46b angularly joined to each other, and the lower edge 46c of the second arm portion 46b is inclined with respect to the direction of the horizontal movement of the circuit breaker 34 so that the arm 46 is rotated in response to the movement of the circuit breaker 34. The left end of the arm 46 is pivotally connected to a stationary structure (not shown) fixed relative to the housing 31.

Figure 2:
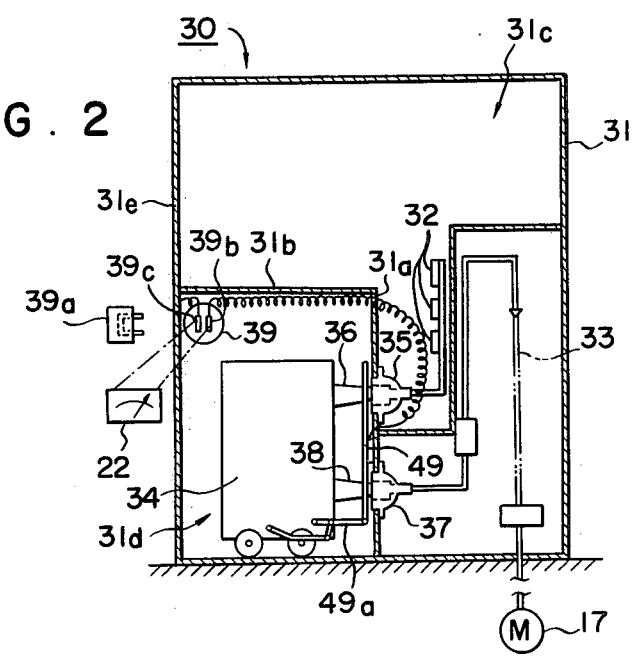
FIG. 2 schematically shows a vertical cross-section of an enclosed switchboard according to the invention, with a circuit breaker in a connected position.

Provided engageably with the lower edge 46c of the second arm portion 46b of the arm 46 is a pusher 45 affixed to the movable circuit breaker 34. The pusher 45 is, in the illustrated embodiment, an extension of the axle of a wheel of the movable circuit breaker 34 (FIG. 2).

The movable contact assembly 38 comprises an electrically conductive stud 38a extending out of the housing 34a of the circuit breaker 34 and electrically insulated from the housing 34a, and an electrically conductive cylinder 38b encircling the end portion of the stud 38a to form a receiving cavity 38c. The stud 42 of the stationary contact assembly is supported by an electrically insulating bushing 40, which in turn is fixed to the vertical wall 31a. One end of the stud 42 is provided to be received in the receiving cavity 38c of the movable contact assembly 38, and to achieve electrical connection with the contact of the movable contact assembly 38. The outer end of the stud 42 is provided with a bore 42a through which a pin 41a of a conductor 41 connected to the cable 33 is inserted for electrical connection with the conductor 41.

To remove any electrical charge on the test terminal 39b before the insulation resistance measurement is conducted, a grounding plug 39a is plugged in the plug socket 39 to connect the test terminal 39b to the grounded terminal 39c.

As the movable circuit breaker 34 is in the disconnected position wherein the movable contact assembly 38 is disconnected from the stationary contact assembly 37, the pusher 45 is not in engagement with the lower edge 46c of the second portion 46b of the arm 46, so that, the arm 46, the connecting lever 47, the lever 48, the link 49 and the insulator bar 52 are, because of their weight, lowered and hence the insulator bar 52 is at about the lowermost position of the slot 55a, and the free end 51b of the test contact member 51 is pressed against the stud 42 of stationary contact assembly 37.

When the circuit breaker 34 is moved towards the connected position, the pusher 45 pushes the lower edge 46c of the second portion 46b of the arm 46, so that the arm 46 is rotated in counter-clockwise direction as viewed in FIGS. 3 and 4, and hence, by virtue of the connecting lever 47, the lever 48 is also rotated in the counter-clockwise direction. As a result, the link 49 is lifted, and the insulator bar 52 is also lifted along the guide slot 55a. With the insulator bar 52, the first end 51a of the test contact member 51 is lifted, i.e., it is moved away from the curved portion 53b of the guide member 53, so that the bent portion 51c of the test contact member 51 is relatively moved along the length of the test contact member 51 away from the first end 51a thereof, due to resilient action of the test contact member 51, and hence the free end 51b of the test contact member 51 is moved away from the stud 42 of the stationary contact assembly 37.

As the circuit breaker 34 reaches the connected position wherein the movable contact assembly 38 is in engagement with the stationary contact assembly 37, the pusher 45 is in engagement with the lower edge of the first portion 46a of the arm 46 for supporting the arm 46, the connecting lever 47, the lever 48, the link 49 and the insulator bar 52, so that the insulator bar 52 is at about the uppermost position of the slot 55a, and the free end 51b of the test contact member 51 is retracted so as not to interfere the movable contact assembly 38.

As the circuit breaker 34 is moved from the connected position to the disconnected position, the pusher 45 ceases to support the arm 46 and the associated members, so that the first end 51a of the test contact member 51 is moved towards the curved portion 53b of the guide member 53, thus causing relative movement of the position of the bent portion along the length of the test contact member towards the first end 51a. Accordingly, the free end 51b of the test contact member 51 is moved towards the stud 42 of the stationary contact assembly 37. The free end 51b of the test contact member 51 is thereby brought in engagement with the stud 42 as the circuit breaker 34 is moved to the disconnected position.

While the test contact member 51 is in engagement with the stud 42 of the stationary contact assembly 37, the test terminal 39b is in electrical connection with the load 17, so that the operator can measure the insulation resistance thereof by contacting one terminal of the insulation resistance tester 22. The operator can be in front of the switchboard when carrying out the measurement.

Because of the function of the mechanism for actuating the test contact member 51, the test terminal 39b is electrically connected to the cable 33 only when the circuit breaker 34 is in the disconnected position, and it is ensured that the test terminal 39b is out of electrical connection with the cable 33 during the measurement of the insulation resistance, and safety of the operator and the insuration resistance tester 22 is substantially enhanced.

Although only one embodiment of the invention has been described in detail, it will be apparent to those skilled in the art that various changes and modifications can be made without departing from the spirit of the invention. For example, the invention is not limited to the particular configuration of the first guide member 53, but the tabs 53f, 53g may be replaced by a pin extending across the walls 53c, 53d or any other means for holding the test contact member 51 inside of the channel 53e, or the first end 51a of the test contact member 51 is so fixed to the insulator bar 54 as to resist the torque due to the resilient deformation at the bent portion, thereby eliminating the need of the tabs 53f, 53g or the pin.

Also, the test terminal 39 may be placed, instead of on the front panel, at any other position where it is easy to have one of the terminals of the insulation resistance tester, contacted with the test terminal 39b.

I claim:

1. In an enclosed switchboard having:
   a stationary contact connected to a load, and
   a movable electrical equipment of the drawout type including a movable contact, said movable electrical equipment being movable between a connected position in which said movable contact is in engagement with said stationary contact and a disconnected position in which said movable contact is out of engagement with said stationary contact,
   the improvement which comprises:
   a test contact member movable between an engaged position in which said test contact member is in engagement with said stationary contact and an unengaged position in which said test contact member is out of engagement with said stationary contact, and
   actuating means for actuating said test contact member such that said test contact member is in said engaged position when said electrical equipment is in said disconnected position, and in said unengaged position when said electrical equipment is in said connected position.

2. An enclosed switchboard as set forth in claim 1, further comprising a guide member including a curved portion, wherein said test contact member is substantially of elongated strip in shape, and has resilient property, and is provided to extend, from a first end thereof, towards said curved portion and is bent at said curved portion so that said test contact member extends, from the bent portion, towards said stationary contact, movement of said first end of said test contact member towards and away from said curved portion causing relative movement of position of said bent portion along the length of said test contact member away from and towards said first end, and movement of a second end of said test contact member towards and away from said stationary contact, and wherein said actuating means is adapted to move said first end of said test contact member towards said curved portion of said guide member as said electrical equipment is moved towards said disconnected position, and to move said first end of said test contact member away from said curved portion of said guide member as said electrical equipment is moved towards said connected position.

3. An enclosed switchboard as set forth in claim 2, wherein said electrical equipment is provided with a pusher, and said actuating means comprises: an arm arranged to be rotated by said pusher as said electrical equipment moves, and means for converting the rotation of said arm into said movement of said first end of said test contact member towards and away from said curved portion of said guide means.

4. An enclosed switchboard as set forth in claim 2, wherein said curved portion of said guide member is electrically conductive, said enclosed switchboard further comprising:
   a test terminal positioned to permit easy access for connection of a terminal of an insulation resistance tester, and means for electrically connecting said test terminal to said curved portion.

5. An enclosed switchboard as set forth in claim 4, further comprising a front panel, wherein said test terminal is mounted on said front panel.

6. An enclosed switchboard as set forth in claim 4, further comprising means for connecting said test terminal to the ground to remove any electrical charge on said test terminal before insulation resistance measurement.

7. An enclosed switchboard as set forth in claim 1, further comprising: a test terminal positioned to permit easy access for connection of a terminal of an insulation resistance tester, and means for electrically connecting said test terminal to said test contact member.

8. An enclosed switchboard as set forth in claim 7, further comprising a front panel, wherein said test terminal is mounted on said front panel.

9. An enclosed switchboard as set forth in claim 7, further comprising means for connecting said test terminal to the ground to remove any electrical charge on said test terminal before insulation resistance measurement.

10. In an enclosed switchboard having:
    a stationary contact connected to a load, and
    a movable electrical equipment of the drawout type including a movable contact, said movable electrical equipment being movable between a connected position in which said movable contact is in engagement with said stationary contact and a disconnected position in which said movable contact is out of engagement with said stationary contact,
    the improvement which comprises:

a test contact member being substantially of elongated strip in shape, having first and second ends, and having resilient property, a guide member including a curved portion made of electrically conductive material, said test contact member being provided to extend from said first end thereof, towards said curved portion and bent at said curved portion so that said test contact member extends, from the bent portion, towards said stationary contact, and being movable between an engaged position in which said second end of said test contact member is in engagement with said stationary contact and an unengaged position in which said second end of said test contact member is out of engagement with said stationary contact, movement of said first end of said test contact member towards and away from said curved portion causing relative movement of position of said bent portion along the length of said test contact member away from and towards said first end, and movement of said second end of said test contact member towards and away from said stationary contact, a pusher mounted to said electrical equipment, actuating means comprising an arm arranged to be rotated by said pusher as said electrical equipment moves and means responsive to the rotation of said arm to move said first end of said test contact member towards said curved portion of said guide member as said electrical equipment is moved towards said disconnected position, so that said test contact member is in said engaged position when said electrical equipment is in said disconnected position, and to move said first end of said test contact member away from said curved portion of said guide member as said electrical equipment is moved towards said connected position, so that said test contact member is in said unengaged position when said electrical equipment is in said connected position, a test terminal positioned to permit easy access for connection of a terminal of an insulation resistance tester, and means for electrically connecting said test terminal to said curved portion.

* * * * *